United States Patent

Perhacs et al.

[11] Patent Number: 5,265,530
[45] Date of Patent: Nov. 30, 1993

[54] PLASTIC BOTTLE AND CAN CRUSHER

[75] Inventors: Leslie Perhacs; Madaline Plueger; Robert G. Salatka, all of Fallbrook, Calif.

[73] Assignee: Jawz, Inc., Fallbrook, Calif.

[21] Appl. No.: 886,388

[22] Filed: May 19, 1992

[51] Int. Cl.5 .......................... B30B 7/00; B30B 9/32
[52] U.S. Cl. ......................... 100/233; 100/295; 100/902
[58] Field of Search ............... 100/233, 293, 295, 902

[56] References Cited

U.S. PATENT DOCUMENTS

| D. 272,539 | 2/1984 | Salatka | 100/902 X |
|---|---|---|---|
| 621,517 | 3/1899 | Blackburn | 100/233 X |
| 2,339,596 | 1/1944 | Wright | 100/902 X |
| 2,614,604 | 10/1952 | Coffey | 100/233 X |
| 3,223,334 | 12/1965 | Wüthrich | 100/233 X |
| 3,299,802 | 1/1967 | Black, Jr. | 100/233 |
| 3,327,621 | 6/1967 | Zysset | 100/233 X |
| 3,776,129 | 12/1973 | Carlson | 100/233 X |
| 3,948,164 | 4/1976 | Pobuda et al. | 100/233 X |
| 4,197,796 | 4/1980 | Salatka | 100/902 X |
| 4,213,387 | 7/1980 | McCaney et al. | 100/293 X |
| 4,333,395 | 6/1982 | Kurtz | 100/233 X |
| 4,394,834 | 7/1983 | Lowe | 100/293 X |
| 4,442,768 | 4/1984 | Bailey | 100/233 |
| 4,561,351 | 12/1985 | Ader | 100/233 |
| 4,653,398 | 3/1987 | Fowler | 100/233 |
| 4,890,552 | 1/1990 | Yelczyn | 100/233 |
| 4,976,196 | 12/1990 | Phillips et al. | 100/233 |
| 5,009,155 | 4/1991 | Christianson | 100/233 |
| 5,038,677 | 8/1991 | Wittman et al. | 100/233 X |
| 5,125,333 | 6/1992 | Gourley, III | 100/233 X |

FOREIGN PATENT DOCUMENTS

| 3307842 | 9/1984 | Fed. Rep. of Germany | 100/902 |
| 221592 | 7/1968 | Sweden | 100/233 |

Primary Examiner—Stephen F. Gerrity
Attorney, Agent, or Firm—Jerry R. Seiler

[57] ABSTRACT

A device for compacting hollow aluminum or plastic containers comprising a base having a concave arc-shaped surface having a first radius, an arm having a convex arc-shaped surface having a second radius, substantially equal to or smaller than the first radius, and a hinge for hingedly securing a first end of the arm adjacent to a first end of the base whereby the arm is pivotally movable on the hinge relative to the base between a closed position in which the convex surface is received and nested in the radius of the concave surface recess and the concave and convex surfaces are substantially parallel along their respective arcs.

22 Claims, 3 Drawing Sheets

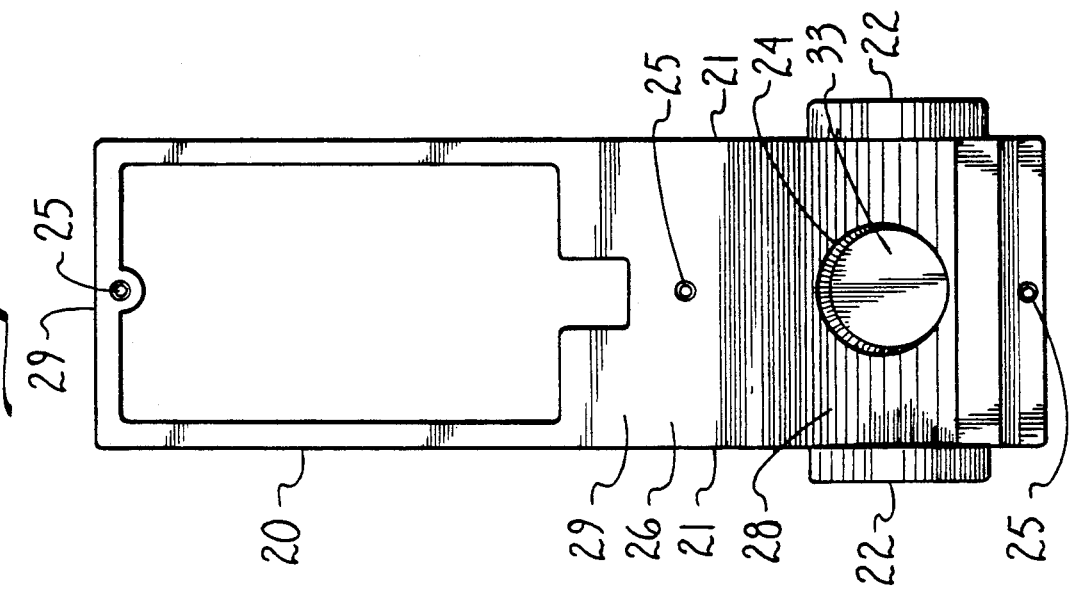
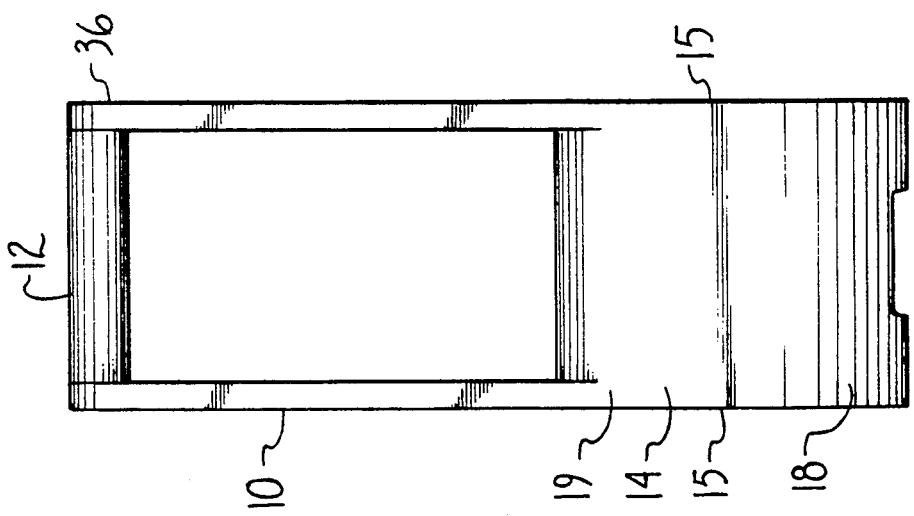

PLASTIC BOTTLE AND CAN CRUSHER

BACKGROUND OF THE INVENTION

In response to a demand for recycling aluminum cans a number of devices have been proposed for crushing or compacting the cans, for example, as disclosed in U.S. Pat. Nos. 4,197,796 and Des. 272,539. More recently, there has also been a substantial demand for recycling plastic containers, particularly plastic bottles and containers in the one quart to one gallon size. However, presently available aluminum can crushers are not suitable for crushing such plastic bottles and containers. It is to an apparatus suitable for compacting aluminum cans and plastic bottles and containers that the present invention is directed.

SUMMARY OF THE INVENTION

The apparatus of the present invention comprises a stationary base member and a hinged arm attached thereto, the hinged arm having a convex crushing surface portion and the base member incorporating a crushing surface having a concave portion. The two surfaces, when urged together, cooperate to crush or compact plastic and aluminum containers therebetween. The apparatus also provides means for maintaining an aluminum can in place during the compacting operation. The components of the apparatus will be more fully described in the following detailed description.

SUMMARY OF THE DRAWINGS

FIG. 2 is a back view of the pivotal arm of the device showing the, crushing surface thereof;

FIG. 3 is a front view of the stationary base member of the apparatus showing the crushing surface thereof;

DETAILED DESCRIPTION OF THE PREFERRED EMBODIMENT

Figure 4:
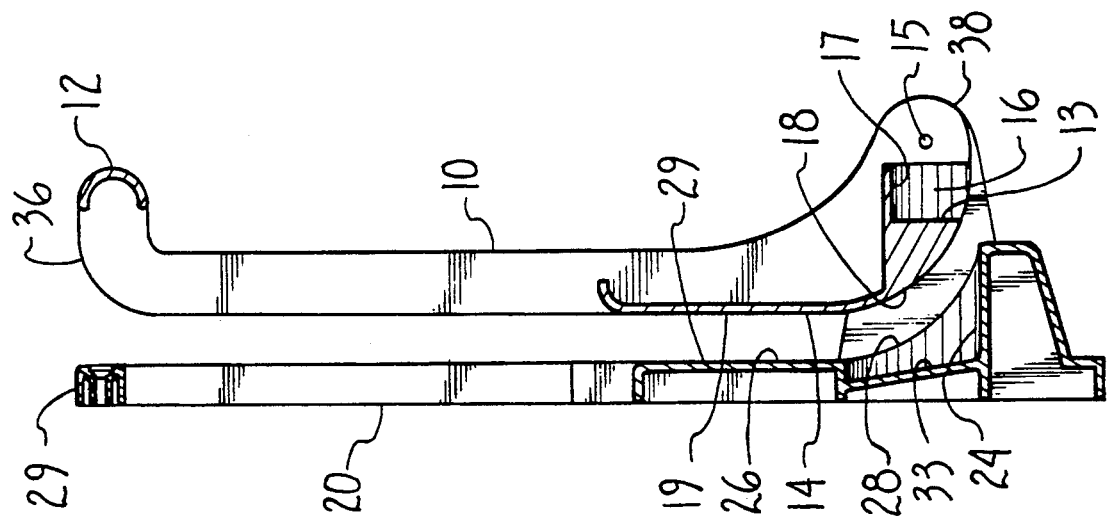
FIG. 4 is a side view, partly in section, showing the nesting relationship of the crushing surfaces when urged together in a closed condition.

As shown in the drawings, the apparatus of the invention comprises a base member 20 and a pivotally movable arm member 10. Arm member 10 has a crushing surface 14 formed on one panel thereof, and base member 20, which is normally secured in a stationary position, has a crushing surface 26 on one panel thereof. The arm member crushing surface 14 has a lower convex arc-shaped surface portion 18 and an upper substantially flat surface portion 19. The base member crushing surface 26 has a lower concave arc-shaped surface portion 28 and an upper substantially flat surface portion 29. The two crushing surfaces face on another and are in a nesting-like position when the arm and base member components are in a generally closed position as illustrated in FIG. 4. Base member 20 includes a pair of brackets 22 on opposite sides of the crushing surface 26 and adjacent lower end 25, each having a hinge pin 11 for hingedly engaging arm 10 adjacent lower end 38 and on which the arm is moved pivotally relative to the base member. Arm 10 is preferably provided with a handle bar 12 extending across its upper end 36, opposite lower end 38.

Observing particularly FIGS. 2, 3 and 4, the relative shape and relationship of respective crushing surfaces 14 and 26 are shown. The concave arc-shaped surface portion 28 has a radius substantially equal to or greater than the radius of the convex arc-shaped surface portion 18, thus forming a cavity capable of receiving the convex surface portion. In a generally closed condition illustrated in FIG. 4, the smaller radius surface 18 is received in the larger radius surface 28, in nesting or mating relationship. Thus, in the closed condition in which flat surface portion 19 of arm member 10 is substantially vertical or substantially parallel with flat surface portion 19 of base member 20, the two crushing surfaces may be somewhat separated, as illustrated, or they may be shaped and sized so they are touching along any portion, or substantially all of their respective facing surface areas. Preferably, the facing crushing surfaces are formed so that at least a slight separation is provided when the apparatus is closed with the upper end 36 of arm 10 abutting or contacting base 20 adjacent upper end 29. However, other features and shapes may be provided, and although not critical, should not interfere with the cooperation between the crushing surfaces 14 and 26 when the device is to be operated.

Figure 1:
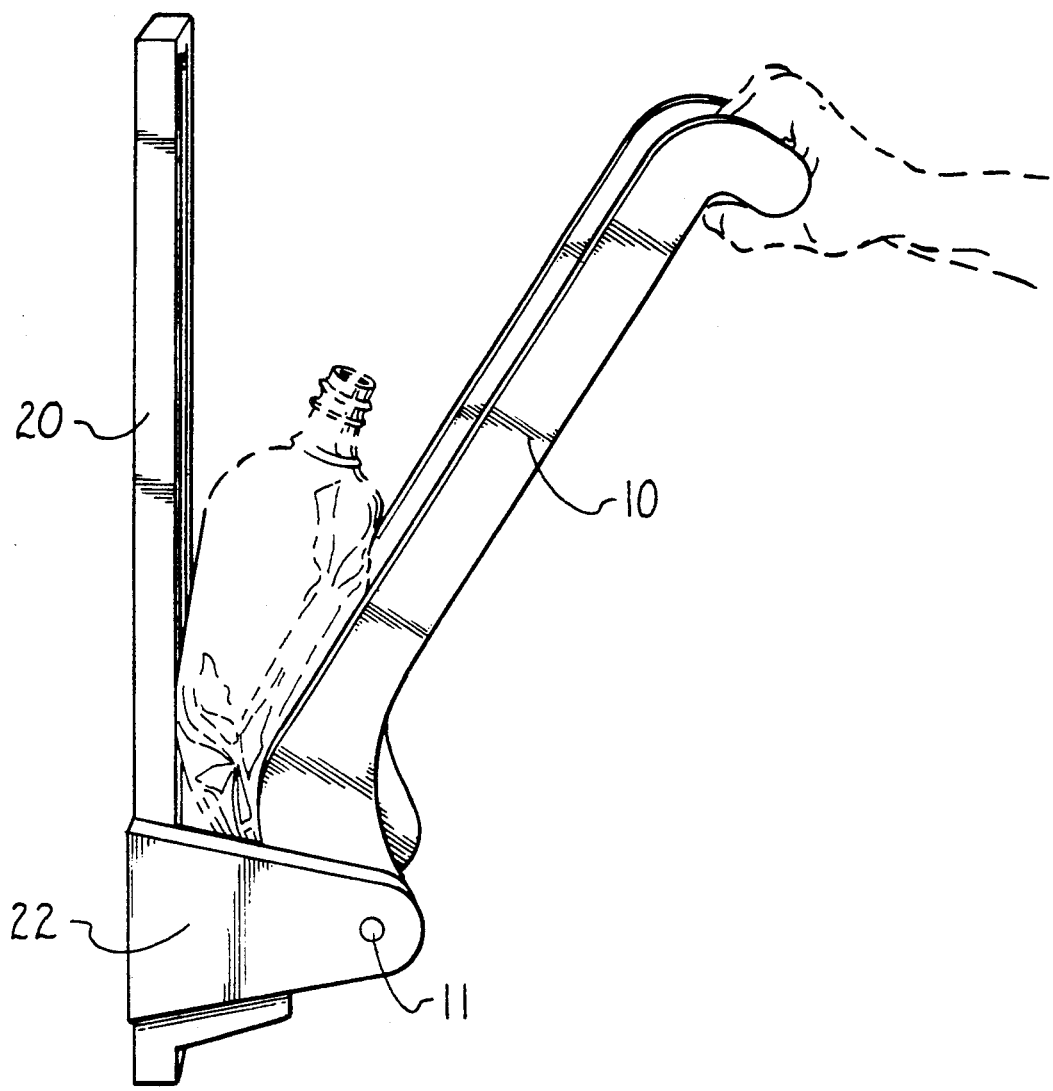
FIG. 1 is a side view illustrating the apparatus of the invention in use for crushing a plastic bottle.
Figure 5:
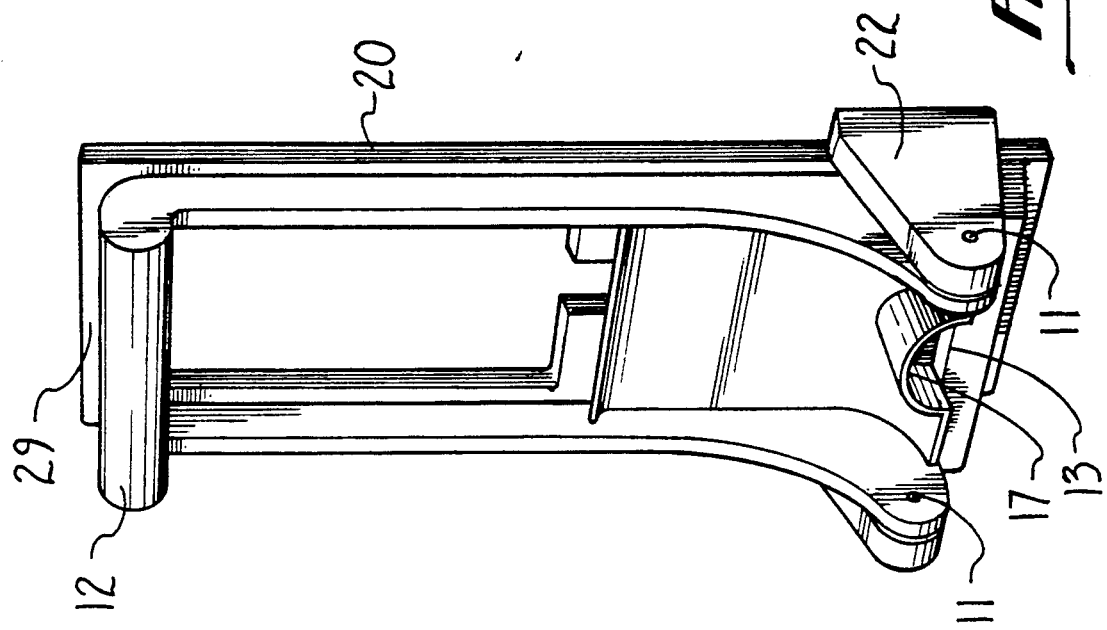
FIG. 5 is a perspective front view of the apparatus.

In addition to the arc-shape portions of the crushing surfaces 14 and 26 of the arm and base components, respectively, a portion of either or both of the crushing surfaces are preferably formed so as to be flat. Observing again FIGS. 2, 3 and 4, in the preferred embodiment, each of the crushing surfaces each have a lower arc-shaped portion and an upper relatively flat shaped portion. In FIG. 2, crushing surface 14 of arm 10 has a lower arc-shape portion 18 and an upper relatively flat portion 19. Similarly, as shown in FIG. 3, crushing surface 26 of base 20 is provided with a lower arc-shaped portion 28 and an upper relatively flat portion 29. The ratio of the flat surface area to arc-shaped surface area of each of the respective crushing surfaces is not critical. In the preferred embodiment shown, the respective surface areas are generally about equal. More importantly, the arc-shaped surface portions preferably have respective radii such that they are generally parallel along their respective facing arc-shaped surfaces, when the flat portions are in a generally parallel position, as shown in FIG. 4. Because of the position of the hinge or pivot point between the base and arm, as the arm is moved toward the base during the initial compacting and crushing operation, the distance between arc-shaped surface portions is less than the distance between the flat surface areas. Thus, during compaction, crushing begins in the lower area of the device between the arc-shaped surfaces as illustrated in FIG. 1. Preferably, the hinge between the base and arm components is positioned to create a gradual crushing operation between the components. The hinge is positioned near the respective ends of the arc-shaped base and arm component surfaces, so that as the arm pivots on the hinge toward the base, the two arc-shaped surfaces because progressively closer, starting from the lower end or region, until the arched surfaces are substantially parallel. This feature provides for substantial crushing forces at or near the bottom of the two arc-shaped surfaces at the beginning of such a compacting operation, and for progressive compaction upwardly between the arched and flattened surface portions.

As illustrated in the preferred embodiment, a cylindrical recess 24 is also provided along the radius of the lower arc-shape surface portion 28, preferably located in the middle of the surface between the two opposite sides 21 as shown in FIG. 3. Recess 24 provides a cavity for receiving an aluminum can to be crushed. Accordingly, for such a purpose, the diameter of cylindrical recess 24 is at least slightly larger than the diameter of a typical twelve ounce aluminum can. It will be appreciated that the specific shape and depth of such a recess may be modified, as desired. The end surface 33 at the back of recess 24 is preferably slanted somewhat relative to flat surface portion 29. The slant of end surface 33 improves the efficiency of the aluminum can compaction by tilting a can placed in the recess 24 when the end of the can is forced against the end surface at the beginning of the crushing operation. The angle of end surface 33 relative to flat surface portion 29, or to vertical when the device is installed on a vertical wall, is preferably between about 3° and about 25°, and more preferably between about 5° and about 15°.

In another preferred embodiment, arm 10 is provided with an arched shelf 17 defining a chamber 16 formed near the lower end 38 of the arm, and preferably centered between the opposite sides 15 of arm 10. Chamber 16 and arched shelf 17 have a shape suitable for receiving one end of a can opposite the end placed in recess 24 when arm 10 and base 20 are fully separated or opened. Chamber 16 also has a back plate or surface 13 which is forced against an aluminum can placed in recess 24 and chamber 16 when arm 10 is moved toward base 20 in a crushing and compacting operation. During such compaction the can also becomes tilted as the end of the can in recess 24 is urged against the slanted surface 33. The back plate 13 may also be shaped to assist in holding an end of a can during the compaction. In a bottle compacting operation, as the arm 10 is pivotally moved toward the base, as shown in FIG. 1, the edge of chamber 16 along the back plate 13 also assists in forcing or holding the bottle in the lower area of the space between the crushing surfaces as they are moved or urged together.

When the apparatus is to be used for crushing a plastic bottle as illustrated in FIG. 1, arm 10 is moved and pivoted away from a generally closed condition shown in FIG. 4 to a position providing a large enough to place a bottle between the crushing surfaces. Preferably the bottle is placed between the arm and base at the lower end of the facing crushing surfaces between the respective arch-shaped surface portions. The operator then grasps handle 12 of arm 10 and urges the arm toward base 20, thereby compacting the bottle between the respective crushing surfaces as shown. After the bottle has been suitably compacted and flattened to the desired extent, arm 10 is again rotated away from base 20, and the article is removed. Similarly, when it is desired to compact an aluminum can, with the arm and base components fully opened the can is conveniently placed horizontally with one end in recess 24 and the other end in chamber 16, and thereafter compacted by urging the arm toward the base member, as above described.

The apparatus may be made of any suitable material, preferably molded of a strong plastic material such as polyethylene, polystyrene, etc., and preferably formed to provide two substantially unitary components, arm 10, and base 20 with hinge support brackets 22 formed as portions of base 20. Moreover, although brackets are shown, they may be replaced by forming the base such that the hinge points, for which they function, are an integral extension of the base. Base 20 is also preferably provided with suitable holes 25 for inserting a screw or anchor for mounting the base member on a wall, or the like. Other features and embodiments within the scope of the apparatus disclosed herein may be used, so long as they do not interfere or detract from the crushing operation as described.

We claim:

1. A device for crushing a container comprising first and second members each having an arc-shaped container engaging surface extending between two opposite substantially parallel side edges, one of said surfaces being convex and the other surface concave, said concave surface having a radius of curvature at least equal to the radius of curvature of said convex surface, hinge means for moving said members relative to one another between a closed position in which said arc-shaped surfaces are facing one another in a generally parallel, mating position, and an open position for placing a container therebetween, wherein said arc-shaped surfaces are located between first and second opposite ends of said first and second members, respectively, wherein the width between said parallel side edges of each of said first and second arc-shaped surfaces is substantially equal, and wherein said hinge means is located adjacent to the first ends of each of said first and second members, respectively, and whereby said members are pivotally movable relative to one another on said hinge means, said arc-shaped surfaces cooperating to form a container crushing surface therebetween when said first and second members are urged toward said closed position.

2. A device of claim 1 wherein said arc-shaped surface of said first member is concave and said arc-shaped surface of said second member is convex.

3. A device of claim 2 wherein said arc-shaped surfaces are spaced apart in said closed position.

4. A device of claim 3 wherein said second member includes a handle adjacent the second end thereof, opposite said first end for pivotally moving said second member between said open and closed positions.

5. A device of claim 4 wherein said first member includes a recess formed along the concave arc-shaped surface thereof.

6. A device of claim 5 wherein said recess is capable of receiving an end of a twelve ounce aluminum can.

7. A device of claim 6 wherein said recess is cylindrical and has an axis generally perpendicular and radial to said arc-shaped surface.

8. A device of claim 7 wherein said recess has a surface at the end thereof slanted upwardly with respect to vertical between about 3° and about 25°, for contacting an end of an aluminum can received in said recess.

9. A device of claim 7 wherein said second member includes an arched shelf for supporting an end portion of an aluminum can received in said recess.

10. A device of claim 9 wherein said second member includes a surface formed at the end of said arched shelf for engaging the end of an aluminum can received in said recess when said first and second members are urged toward a closed position.

11. A device of claim 4 wherein said hinge means includes a pair of opposite hinge support brackets secured on opposite sides of said first member, and wherein each of said hinge support brackets hingedly engages said second member.

12. A device of claim 11 wherein said hinge support brackets hingedly engage opposite sides of said second member adjacent the first end thereof.

13. A device of claim 12 wherein each of said first and second members includes a substantially flat planar surface portion extending from said arc-shaped surface toward said second end of said member, said flat planar surface portions of said first and second members being substantially parallel with one another when said members are in said closed position.

14. A device of claim 13 wherein said arc-shaped surfaces are substantially parallel along their respective arcs when said substantially flat planar surfaces portions are substantially parallel.

15. The device of claim 1 wherein said hinge means is positioned to provide for progressive compaction upwardly between said arc-shaped surfaces starting adjacent said first ends of said first and second members.

16. A device for crushing a container comprising:
   a base having a concave arc-shaped surface thereon, said concave surface having a first radius of curvature, and including a first recess formed thereon for receiving a first end of an aluminum can,
   an arm having a convex arc-shaped surface thereon, said convex surface having a second radius of curvature at most equal to said first radius of curvature, and
   hinge means for hingedly securing a first end of said arm adjacent to a first end of said base whereby said arm is pivotally movable on said hinge means relative to said base between an open position for receiving a container between the arm and the base and a closed position in which said convex surface is substantially received and nested in said concave surface recess and said convex and concave surfaces are substantially parallel along their respective arcs.

17. A device of claim 16 including a second recess formed on said arm adjacent said convex arc-shaped surface for receiving a second end of an aluminum can.

18. A device of claim 17 including a can engaging surface extending across said second recess.

19. A device of claim 18 wherein said hinge means comprises a pair of brackets, secured on opposite sides of said base adjacent to the first end thereof, wherein each bracket has a hinge pin therein secured in hinged engagement with said arm adjacent to the first end thereof.

20. A device of claim 19 including a handle formed on a second end of said arm, opposite said first end.

21. A device of claim 20 wherein said base includes mounting means for being secured on a vertical surface.

22. The device of claim 16 wherein said hinge means is positioned so that the arc-shaped surfaces become progressively closer along the length of their respective arched surfaces starting adjacent said hinge means.

* * * * *